United States Patent
Otsuka et al.

(10) Patent No.: US 9,116,028 B2
(45) Date of Patent: Aug. 25, 2015

(54) THERMAL FLOW SENSOR AND METHOD OF GENERATING FLOW RATE DETECTION SIGNAL BY THE THERMAL FLOW SENSOR

(71) Applicants: Kazuhiko Otsuka, Tokyo (JP); Koji Tanimoto, Tokyo (JP); Yuji Ariyoshi, Tokyo (JP)

(72) Inventors: Kazuhiko Otsuka, Tokyo (JP); Koji Tanimoto, Tokyo (JP); Yuji Ariyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 236 days.

(21) Appl. No.: 13/850,036

(22) Filed: Mar. 25, 2013

(65) Prior Publication Data
US 2014/0076044 A1    Mar. 20, 2014

(30) Foreign Application Priority Data
Sep. 20, 2012 (JP) ................. 2012-206704

(51) Int. Cl.
G01F 1/68 (2006.01)
G01F 1/696 (2006.01)
G01F 1/72 (2006.01)
G01F 1/69 (2006.01)

(52) U.S. Cl.
CPC *G01F 1/696* (2013.01); *G01F 1/72* (2013.01); *G01F 1/68* (2013.01); *G01F 1/69* (2013.01); *G01F 1/6965* (2013.01)

(58) Field of Classification Search
CPC ..... G01F 1/684; G01F 1/6842; G01F 1/6845; G01F 1/6847; G01F 1/688; G01F 1/6882; G01F 1/6884; G01F 1/6886; G01F 1/6888; G01F 1/69; G01F 1/696; G01F 1/6965; G01F 1/698

USPC ................ 73/204.11–204.18, 204.23–204.27
See application file for complete search history.

(56) References Cited

U.S. PATENT DOCUMENTS

| | | | |
|---|---|---|---|
| 2004/0040377 A1* | 3/2004 | Tanimoto et al. | 73/204.15 |
| 2010/0223991 A1* | 9/2010 | Muraoka et al. | 73/204.11 |
| 2011/0023597 A1* | 2/2011 | Nakano et al. | 73/204.25 |

FOREIGN PATENT DOCUMENTS

| | | |
|---|---|---|
| JP | 08-105779 A | 4/1996 |
| JP | 11-201793 A | 7/1999 |
| JP | 2010-190715 A | 9/2010 |

OTHER PUBLICATIONS

Japanese Office Action (Preliminary Notice of Reasons for Rejection) mailed Jan. 14, 2014, Patent Application No. 2012-206704.

* cited by examiner

*Primary Examiner* — Lisa Caputo
*Assistant Examiner* — Jonathan Dunlap
(74) *Attorney, Agent, or Firm* — Sughrue Mion, PLLC; Richard C. Turner

(57) ABSTRACT

Provided is a thermal flow sensor capable of obtaining a flow rate detection signal that differs depending on a flow direction of a fluid, with a simple configuration and at low cost. The thermal flow sensor includes: a bridge circuit (1) for outputting a flow rate detection signal (VM); a fluid direction detection circuit (2) for outputting a fluid direction detection signal (VD); and an arithmetic circuit (3, 4, 6) configured to: generate a first output signal (VQF) and a second output signal (VQR) based on the flow rate detection signal (VM) and the fluid direction detection signal (VD); and select the first output signal (VQF) when the fluid direction detection signal (VD) shows normal flow and select the second output signal (VQR) when the fluid direction detection signal (VD) shows reverse flow, to thereby output a flow rate detection signal (VOUT).

8 Claims, 6 Drawing Sheets

THERMAL FLOW SENSOR AND METHOD OF GENERATING FLOW RATE DETECTION SIGNAL BY THE THERMAL FLOW SENSOR

BACKGROUND OF THE INVENTION

1. Field of the Invention

The present invention relates to a thermal flow sensor of a heating current detection type for detecting a flow rate of a fluid by electrically detecting the amount of heat transferred to the fluid from a heating element disposed in the fluid. In particular, the present invention relates to a thermal flow sensor and a method of generating a flow rate detection signal by the thermal flow sensor, which are capable of obtaining a detection value that differs depending on a flow direction of a fluid, with a simple configuration.

2. Description of the Related Art

In a typical thermal flow sensor, a heating element and a fluid temperature detector are disposed in a fluid, and a bridge circuit is formed by the heating element, the fluid temperature detector, and a plurality of resistors. A heating current to be supplied to the heating element is controlled so that the bridge circuit may always maintain a state of equilibrium. In this manner, the temperature of the heating element is always kept to be a temperature higher than the temperature of the fluid detected by the fluid temperature detector by a predetermined temperature.

By the way, there is widely used a thermal flow sensor of a so-called heating current detection type, which uses a heating current as a flow rate detection signal by utilizing the dependence of the heating current on the flow rate of the fluid. This thermal flow sensor, however, has a problem in that the flow rate detection signal takes the same value for normal flow and reverse flow, regardless of the flow direction of the fluid.

As a method for solving the problem, it is known to dispose two bridges upstream and downstream in the flow direction of the fluid and use a difference between respective heating currents as a flow rate detection signal, to thereby obtain a flow rate detection signal that differs depending on the flow direction of the fluid (see, for example, Japanese Patent Application Laid-open No. Hei 11-201793).

As another method, the following is known. A flow rate detection signal detected from a heating current is converted from voltage to current, and after a direction of the current is switched in response to an output from a fluid direction detection circuit for detecting the flow direction of the fluid, current-to-voltage conversion is performed, to thereby obtain a flow rate detection signal that differs depending on the flow direction of the fluid (see, for example, Japanese Patent Application Laid-open No. Hei 08-105779).

The conventional technologies, however, have the following problem.

In the methods disclosed in Japanese Patent Application Laid-open Nos. Hei 11-201793 and Hei 08-105779, a flow rate detection signal that differs depending on the flow direction of the fluid can be obtained, but both the methods need a complicated, large-scale circuit, which hinders reduction in size and cost.

SUMMARY OF THE INVENTION

The present invention has been made in view of the above-mentioned problem, and it is an object thereof to provide a thermal flow sensor and a method of generating a flow rate detection signal by the thermal flow sensor, which are capable of obtaining a flow rate detection signal that differs depending on a flow direction of a fluid, with a simple configuration and at low cost.

According to an exemplary embodiment of the present invention, there is provided a thermal flow sensor including: a bridge circuit including a heating element, a fluid temperature detector, and a resistor, the heating element being supplied with a heating current so that temperature of the heating element becomes higher than temperature of a fluid detected by the fluid temperature detector by a predetermined temperature, the bridge circuit being configured to output a flow rate detection signal corresponding to the heating current; a fluid direction detection circuit for outputting a flow direction of the fluid as a fluid direction detection signal; and an arithmetic circuit being configured to: generate a first output signal and a second output signal based on the flow rate detection signal output from the bridge circuit and the fluid direction detection signal output from the fluid direction detection circuit; and select the first output signal when the fluid direction detection signal shows normal flow and select the second output signal when the fluid direction detection signal shows reverse flow, to thereby output a flow rate detection signal that takes the flow direction into account so that the flow rate detection signal takes different values between the normal flow and the reverse flow even at the same flow rate.

Further, according to an exemplary embodiment of the present invention, there is provided a method of generating a flow rate detection signal by a thermal flow sensor, the thermal flow sensor including: a bridge circuit including a heating element, a fluid temperature detector, and a resistor, the heating element being supplied with a heating current so that temperature of the heating element becomes higher than temperature of a fluid detected by the fluid temperature detector by a predetermined temperature, the bridge circuit being configured to output a flow rate detection signal corresponding to the heating current; and a fluid direction detection circuit for outputting a flow direction of the fluid as a fluid direction detection signal, the method including: generating a first output signal and a second output signal based on the flow rate detection signal output from the bridge circuit and the fluid direction detection signal output from the fluid direction detection circuit; selecting the first output signal when the fluid direction detection signal shows normal flow and outputting the first output signal as a flow rate detection signal that takes the flow direction into account; selecting the second output signal when the fluid direction detection signal shows reverse flow and outputting the second output signal as a flow rate detection signal that takes the flow direction into account; and thereby outputting a flow rate detection signal that takes the flow direction into account so that the flow rate detection signal takes different values between the normal flow and the reverse flow even at the same flow rate.

The present invention configures the circuit for generating the first output signal and the second output signal based on the flow rate detection signal and the fluid direction detection signal, and selecting the first output signal when the fluid direction detection signal shows normal flow while selecting the second output signal when the fluid direction detection signal shows reverse flow. Thus, the present invention can obtain the thermal flow sensor and the method of generating a flow rate detection signal by the thermal flow sensor, which are capable of obtaining a flow rate detection signal that differs depending on a flow direction of a fluid, with a simple configuration and at low cost.

DETAILED DESCRIPTION OF THE PREFERRED EMBODIMENTS

In the following, a thermal flow sensor and a method of generating a flow rate detection signal by a thermal flow sensor according to exemplary embodiments of the present invention are described with reference to the accompanying drawings.

First Embodiment

Figure 1:
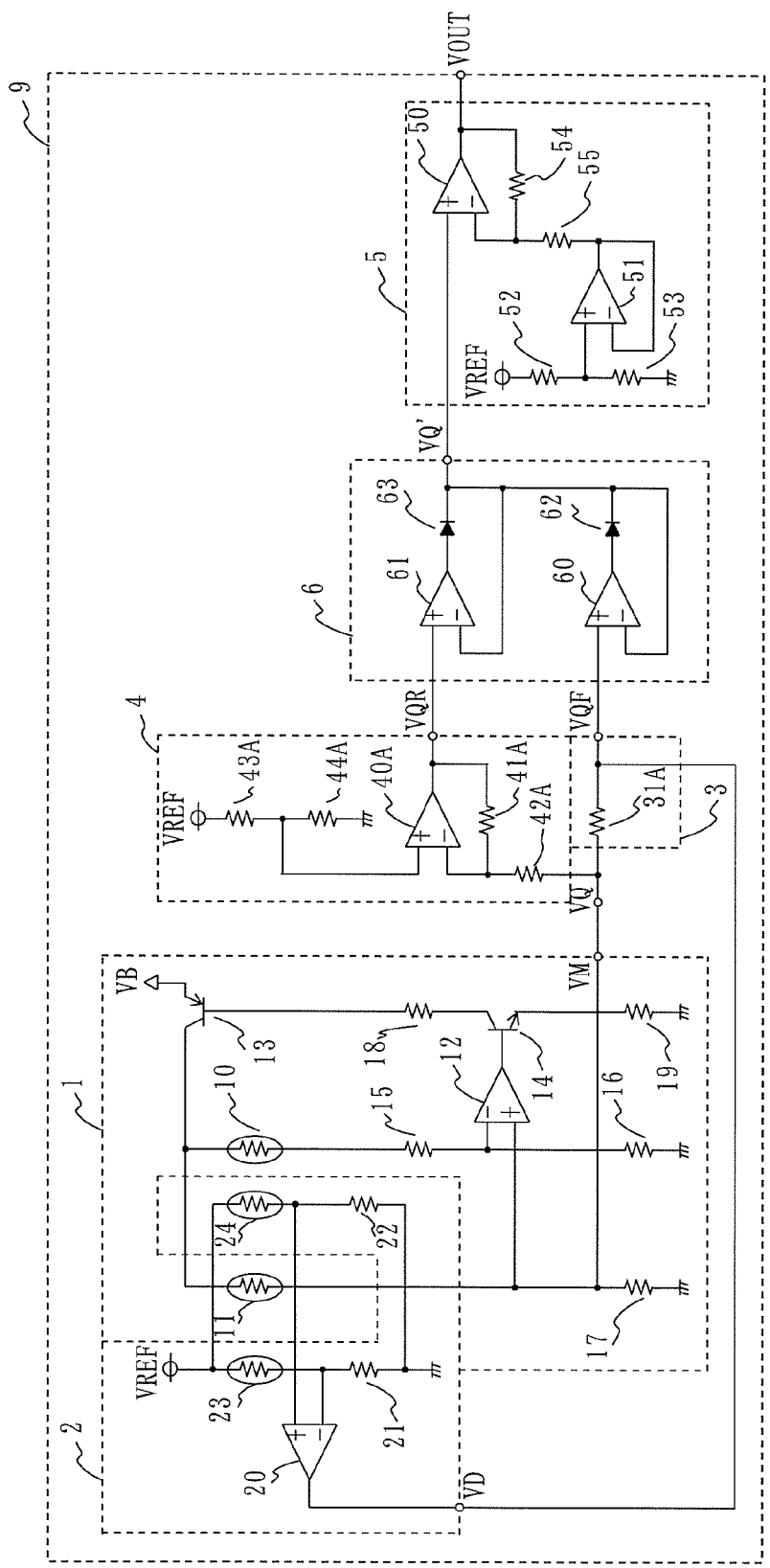
FIG. 1 is a diagram illustrating a basic circuit configuration of a thermal flow sensor according to a first embodiment of the present invention.

FIG. 1 is a diagram illustrating a basic circuit configuration of a thermal flow sensor according to a first embodiment of the present invention. A thermal flow sensor 9 illustrated in FIG. 1 includes a bridge circuit 1, a fluid direction detection circuit 2, a first arithmetic circuit 3, a second arithmetic circuit 4, an output adjustment circuit 5, and an OR circuit 6 (corresponding to a third arithmetic circuit).

First, the functions and input/output signals of the respective circuits are described. The bridge circuit 1 is a circuit for detecting a flow rate, and outputs a flow rate detection signal VM. The fluid direction detection circuit 2 is a circuit for detecting a flow direction of a fluid, and outputs a fluid direction detection signal VD.

The first arithmetic circuit 3, the second arithmetic circuit 4, and the OR circuit 6 correspond to a circuit for obtaining a flow rate detection signal that differs depending on the flow direction of the fluid. The first arithmetic circuit 3 inputs the flow rate detection signal VM detected by the bridge circuit 1 as an input signal VQ, and outputs a first output signal VQF as an arithmetic result based on the fluid direction detection signal VD input from the fluid direction detection circuit 2.

The second arithmetic circuit 4, on the other hand, inputs the flow rate detection signal VM detected by the bridge circuit 1 as the input signal VQ, and outputs a second output signal VQR as an arithmetic result. The OR circuit 6 inputs the first output signal VQF from the first arithmetic circuit 3 and the second output signal VQR from the second arithmetic circuit 4, and outputs a third output signal VQ'.

The output adjustment circuit 5 is a circuit for adjusting the output of the thermal flow sensor 9 within a predetermined tolerance. The output adjustment circuit 5 inputs the third output signal VQ' from the OR circuit 6, and outputs a final output signal VOUT.

Next, the internal configurations and operations of the respective components are described in detail.

The bridge circuit 1 includes a fluid temperature detector 10, a heating element 11, an operational amplifier 12, transistors 13 and 14, and resistors 15 to 19.

The fluid temperature detector 10 is formed at a position not affected by heat from the heating element 11. The fluid temperature detector 10 and the heating element 11 are formed of a temperature sensitive resistance material whose resistance value changes depending on temperature, such as platinum and nickel.

In a series element of the heating element 11 and the resistor 17, a terminal on the resistor 17 side is grounded and a terminal on the heating element 11 side is connected to a power supply side terminal. In a series element of the fluid temperature detector 10 and the resistors 15 and 16, a terminal on the resistor 16 side is grounded and a terminal on the fluid temperature detector 10 side is connected to the power supply side terminal.

A non-inverting input terminal of the operational amplifier 12 is connected to a node between the heating element 11 and the resistor 17. On the other hand, an inverting input terminal of the operational amplifier 12 is connected to a node between the resistor 15 and the resistor 16. An output terminal of the operational amplifier 12 is connected to a base terminal of the transistor 14.

An emitter terminal of the transistor 14 is grounded via the resistor 19, and a collector terminal of the transistor 14 is connected to a base terminal of the transistor 13 via the resistor 18. An emitter terminal of the transistor 13 is connected to a battery power source VB, and a collector terminal of the transistor 13 is connected to the fluid temperature detector 10 and the heating element 11.

The operational amplifier 12 amplifies an error (potential difference) between the input terminals (inverting input terminal and non-inverting input terminal) and provides feedback via the transistors 13 and 14 and the resistors 18 and 19 to heat the heating element 11, thereby controlling the temperature of the heating element 11 to be higher than the temperature of the fluid temperature detector 10 by a predetermined temperature.

In this case, when the flow rate of the fluid increases, the amount of heat transferred from the heating element 11 to the fluid increases, and hence the resistance of the heating element 11 is supposed to decrease. However, the output of the operational amplifier 12 changes to the positive side so that the potential of the node between the heating element 11 and the resistor 17 and the potential of the node between the resistor 15 and the resistor 16 become equal to each other. As a result, the currents of the transistors 13 and 14 increase, and hence the current flowing through the heating element 11 increases.

On the other hand, when the flow rate of the fluid decreases, the operation is reverse to the above-mentioned operation in the case where the flow rate of the fluid increases. In other words, the current flowing through the heating element 11 depends on the increase/decrease in the flow rate of the fluid, and hence the flow rate detection signal VM is obtained as the voltage generated across the resistor 17.

Next, the fluid direction detection circuit 2 includes a comparator 20, resistors 21 and 22, and heating element temperature detectors 23 and 24. The comparator 20 has an open collector output. The heating element temperature detectors 23 and 24 are disposed at positions affected by heat from the heating element 11.

The comparator 20 operates as follows:
when Vc+>Vc−, VcOUT is open;
when Vc+<Vc−, VcOUT is L≈0 V,
where Vc+ represents a voltage of a non-inverting input terminal of the comparator 20, Vc− represents a voltage of an inverting input terminal of the comparator 20, and VcOUT represents an output voltage of the comparator 20.

The heating element temperature detector 23 is disposed downstream of the heating element 11 in the flow direction of the fluid. The heating element temperature detector 24, on the other hand, is disposed upstream of the heating element 11 in the flow direction of the fluid. The heating element temperature detectors 23 and 24 are formed of a temperature sensitive resistance material whose resistance value changes depending on temperature, such as platinum and nickel, similarly to the fluid temperature detector 10 and the heating element 11.

In a series element of the heating element temperature detector 23 and the resistor 21, a terminal on the heating element temperature detector 23 side is connected to a reference voltage VREF and a terminal on the resistor 21 side is grounded. A node between the heating element temperature detector 23 and the resistor 21 is connected to the inverting input terminal of the comparator 20.

In a series element of the heating element temperature detector 24 and the resistor 22, on the other hand, a terminal on the heating element temperature detector 24 side is connected to the reference voltage VREF and a terminal on the resistor 22 side is grounded. A node between the heating element temperature detector 24 and the resistor 22 is connected to the non-inverting input terminal of the comparator 20.

The heating element temperature detectors 23 and 24 are formed of materials having the same and positive temperature coefficient and therefore have the same resistance value at the same temperature, and the resistance value of the resistor 21 and the resistance value of the resistor 22 are equal to each other.

In this case, when the flow direction of the fluid is normal, the heating element temperature detector 24 disposed upstream of the heating element 11 is less affected by heat from the heating element 11 than the heating element temperature detector 23 disposed downstream of the heating element 11. Accordingly, the temperature and the resistance value of the heating element temperature detector 23 become higher than the temperature and the resistance value of the heating element temperature detector 24.

As a result, the voltage of the inverting input terminal of the comparator 20 becomes lower than the voltage of the non-inverting input terminal, and the output of the comparator 20, namely the fluid direction detection signal VD as the output of the fluid direction detection circuit 2, becomes OPEN.

When the flow direction of the fluid is reverse, the operation reverse to the above is performed. The voltage of the inverting input terminal of the comparator 20 becomes higher than the voltage of the non-inverting input terminal, and the output of the comparator 20, namely the fluid direction detection signal VD as the output of the fluid direction detection circuit 2, becomes LOW.

Note that, the configurations of the bridge circuit 1 and the fluid direction detection circuit 2 described above are merely an example, and may be another configuration. The same holds true for the following embodiments.

Figure 2:
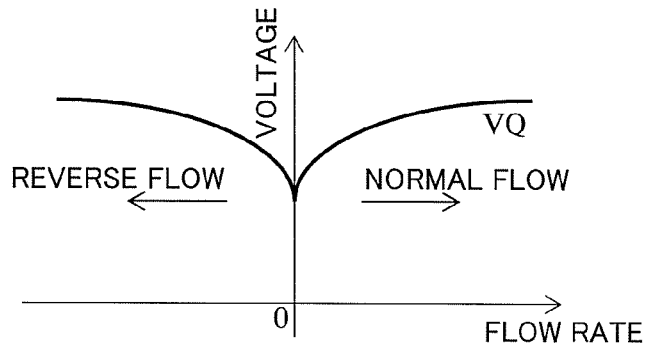
FIG. 2 is a graph showing the relationship between the flow rate and an input signal of a first arithmetic circuit according to the first embodiment of the present invention.

Next, the first arithmetic circuit 3 includes a resistor 31A. One end of the resistor 31A is connected to the flow rate detection signal VM detected by the bridge circuit 1, which is applied as the input signal VQ of the first arithmetic circuit 3. FIG. 2 is a graph showing the relationship between the flow rate and the input signal VQ of the first arithmetic circuit 3 according to the first embodiment of the present invention. The value of VQ shown in FIG. 2 is the same both for normal flow and for reverse flow, regardless of the flow direction of the fluid.

The other end of the resistor 31A is connected to the fluid direction detection signal VD, which is the output of the fluid direction detection circuit 2. In this case, when the flow direction of the fluid is normal, the fluid direction detection signal VD is open, and hence the first output signal VQF as the output of the first arithmetic circuit 3 becomes equal to the input signal VQ.

Figure 3:
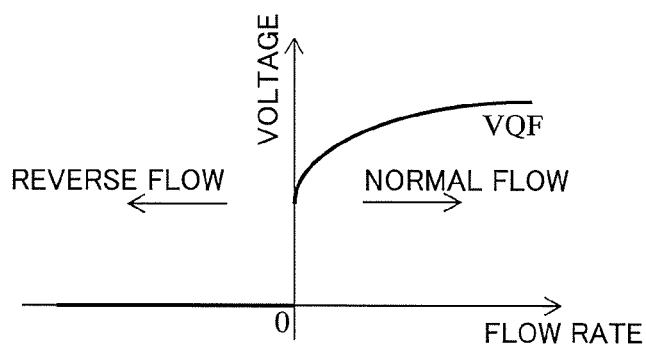
FIG. 3 is a graph showing the relationship between the flow rate and an output signal of the first arithmetic circuit according to the first embodiment of the present invention.

On the other hand, when the flow direction of the fluid is reverse, the fluid direction detection signal VD is L, and hence the first output signal VQF as the output of the first arithmetic circuit 3 becomes about 0 V. FIG. 3 is a graph showing the relationship between the flow rate and the output signal VQF of the first arithmetic circuit 3 according to the first embodiment of the present invention.

Next, the second arithmetic circuit 4 includes an operational amplifier 40A and resistors 41A to 44A, and is formed as a differential amplifier circuit. The flow rate detection signal VM detected by the bridge circuit 1 is applied also to the second arithmetic circuit 4 as the input signal VQ, similarly to the first arithmetic circuit 3.

In a series element of the resistor 41A and the resistor 42A, a terminal on the resistor 42A side is connected to the input signal VQ, and a terminal on the resistor 41A side is connected to an output terminal of the operational amplifier 40A. A node between the resistor 41A and the resistor 42A is connected to an inverting input terminal of the operational amplifier 40A. On the other hand, a non-inverting input terminal of the operational amplifier 40A is grounded via the resistor 44A and is also connected to the reference voltage VREF via the resistor 43A.

A voltage at the non-inverting input terminal of the operational amplifier 40A is set so as to be equal to an input signal VQ0 of the first arithmetic circuit 3 and the second arithmetic circuit 4 in a flat calm. Further, the gain determined by the ratio between a resistance value R41 of the resistor 41A and a resistance value R42 of the resistor 42A is represented by A. In this case, the output of the operational amplifier 40A, namely the output signal VQR of the second arithmetic circuit 4, is expressed by Expression (1) below:

$$VQR = VQ0 + A(VQ0 - VQ) \tag{1}$$

provided that A=R41/R42.

Figure 4:
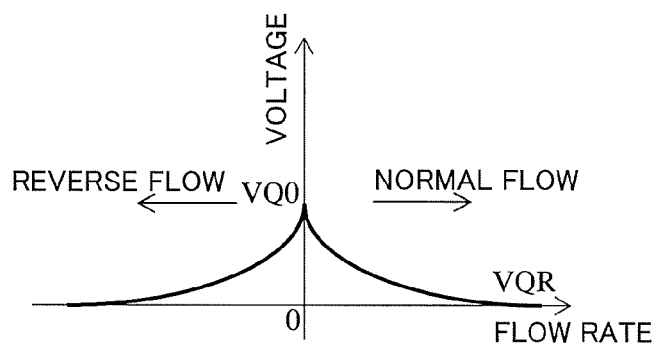
FIG. 4 is a graph showing the relationship between the flow rate and an output signal of a second arithmetic circuit according to the first embodiment of the present invention.

FIG. 4 is a graph showing the relationship between the flow rate and the output signal VQR of the second arithmetic circuit 4 according to the first embodiment of the present invention.

Note that, in FIG. 1, the flow rate detection signal VM detected by the bridge circuit 1 is input directly as the input signal VQ of the first arithmetic circuit 3 and the second arithmetic circuit 4. However, the thermal flow sensor in the first embodiment is not limited to this configuration. The flow rate detection signal VM may be input via a buffer as the input signal VQ of the first arithmetic circuit 3 and the second arithmetic circuit 4. The same holds true for the following embodiments.

Next, the OR circuit 6 as the third arithmetic circuit includes operational amplifiers 60 and 61 and diodes 62 and 63. A non-inverting input terminal of the operational amplifier 60 inputs the output signal VQF of the first arithmetic circuit 3. An output terminal of the operational amplifier 60 is connected to an inverting input terminal of the operational amplifier 60 via the diode 62 in the normal direction, thereby forming an ideal diode.

Similarly, a non-inverting input terminal of the operational amplifier 61 inputs the output signal VQR of the second arithmetic circuit 4. An output terminal of the operational amplifier 61 is connected to an inverting input terminal of the operational amplifier 61 via the diode 63 in the normal direction, thereby forming an ideal diode.

Figure 5:
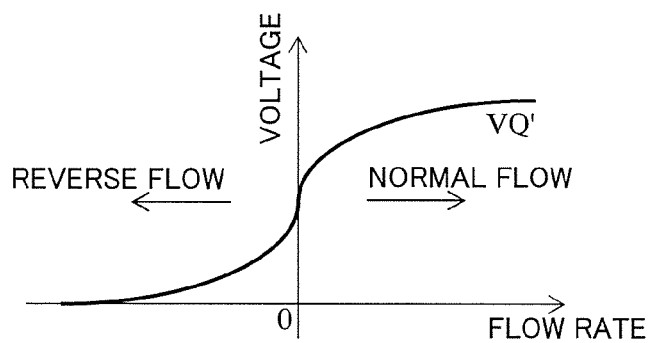
FIG. 5 is a graph showing the relationship between the flow rate and an output signal of an OR circuit according to the first embodiment of the present invention.

A cathode terminal of the diode 62 and a cathode terminal of the diode 63 are connected to each other. As a result, a higher voltage of the output signal VQF of the first arithmetic circuit 3 and the output signal VQR of the second arithmetic circuit 4 is output as the third output signal VQ'. FIG. 5 is a graph showing the relationship between the flow rate and the output signal VQ' of the OR circuit 6 according to the first embodiment of the present invention. As apparent from FIGS. 2 and 5, the thermal flow sensor 9 in the first embodiment can obtain the third output signal VQ' as a flow rate detection signal that differs depending on the flow direction of the fluid.

Figure 6A:
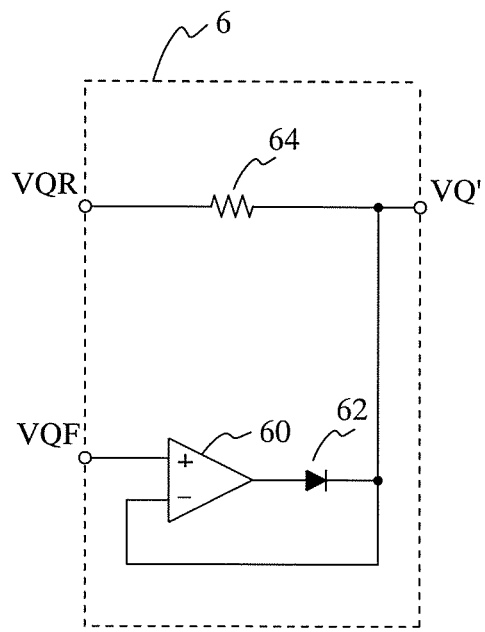
FIG. 6A is a diagram illustrating a different configuration of the OR circuit from FIG. 1 according to the first embodiment of the present invention.
Figure 6B:
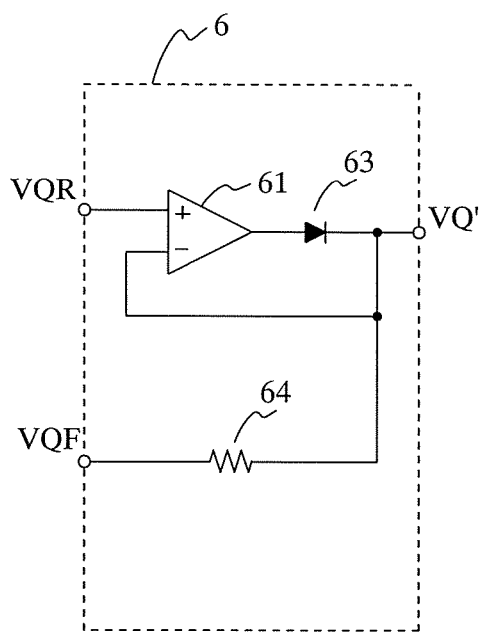
FIG. 6B is a diagram illustrating another different configuration of the OR circuit from FIG. 1 according to the first embodiment of the present invention.

Note that, in FIG. 1, the OR circuit 6 is formed of two ideal diodes. However, the OR circuit 6 in the first embodiment is not limited to this configuration. FIGS. 6A and 6B are diagrams illustrating different configurations of the OR circuit 6 from FIG. 1 according to the first embodiment of the present invention. As illustrated in FIGS. 6A and 6B, one of the ideal diodes may be formed of a resistor 64. The same holds true for the following embodiments.

Next, the output adjustment circuit 5 includes operational amplifiers 50 and 51 and resistors 52 to 55. In a series element of the resistor 52 and the resistor 53, a terminal on the resistor 53 side is grounded, and a terminal on the resistor 52 side is connected to the reference voltage VREF. A node between the resistor 52 and the resistor 53 is connected to a non-inverting input terminal of the operational amplifier 51. An output terminal of the operational amplifier 51 is connected to an inverting input terminal of the operational amplifier 51.

The output terminal of the operational amplifier 51 is also connected to an inverting input terminal of the operational amplifier 50 via the resistor 55. The inverting input terminal of the operational amplifier 50 is also connected to an output terminal of the operational amplifier 50 via the resistor 54.

A non-inverting input terminal of the operational amplifier 50 is applied with the output signal VQ' of the OR circuit 6. Then, the operational amplifier 50 performs operation of Expression (2) below to output VOUT as an output signal of the thermal flow sensor 9, which has been adjusted so as to fall within a predetermined tolerance:

$$VOUT = (1 + R54/R55)VQ' - VOFF \times R54/R55 \quad (2)$$

provided that $VOFF = VREF \times R53/(R52+R53)$.

Note that, in FIG. 1, a configuration example of the output adjustment circuit 5 is a differential amplifier circuit having a linear equation. However, the output adjustment circuit 5 in the first embodiment is not limited to this configuration. For example, the output adjustment circuit 5 may perform another method such as operation with a high-powered equation performed by a microcomputer or the like. The same holds true for the following embodiments.

Further, the fluid direction detection circuit 2, the second arithmetic circuit 4, and the output adjustment circuit 5 use the common reference voltage VREF, but it is not always necessary to use the same reference voltage. The same holds true for the following embodiments.

As described above, according to the first embodiment, the first arithmetic circuit, the second arithmetic circuit, and the OR circuit are used to generate the first output signal and the second output signal, and the first output signal is selected in the case of normal flow while the second output signal is selected in the case of reverse flow. As a result, the circuit for obtaining a flow rate detection signal that differs depending on the flow direction of the fluid can be realized by a simple, inexpensive, and compact configuration as compared with the conventional technologies.

Second Embodiment

In the above-mentioned first embodiment, the third output signal VQ' is input to the output adjustment circuit 5, and the output signal VOUT of the thermal flow sensor 9 is adjusted by the output adjustment circuit 5 provided at the last stage so as to fall within a predetermined tolerance and is then output to the outside. In a second embodiment of the present invention, on the other hand, the output adjustment circuit 5 is disposed at a position other than the last stage in the thermal flow sensor 9.

Figure 7:
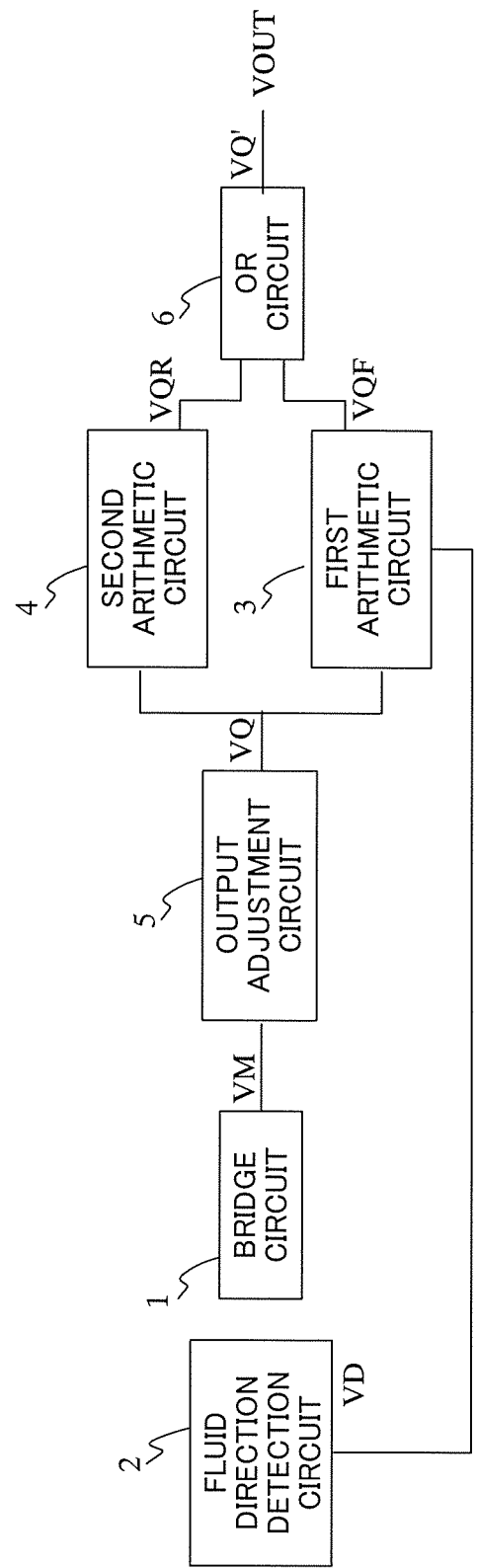
FIG. 7 is a diagram illustrating a basic circuit configuration of a thermal flow sensor according to a second embodiment of the present invention.

FIG. 7 is a diagram illustrating a basic circuit configuration of a thermal flow sensor according to the second embodiment of the present invention. As illustrated in FIG. 7, the flow rate detection signal VM as the output of the bridge circuit 1 may be adjusted by the output adjustment circuit 5 so as to fall within a predetermined tolerance, and after that, the flow rate detection signal VM may be subjected to operations in the first arithmetic circuit 3 and the second arithmetic circuit 4 to be input to the OR circuit 6 as the third arithmetic circuit so that the output signal VQ' of the OR circuit 6 is used as the output signal VOUT of the thermal flow sensor 9.

As described above, according to the second embodiment, even when the output adjustment circuit is disposed at a subsequent stage of the bridge circuit, the same effect as in the above-mentioned first embodiment can be obtained.

Third Embodiment

In the above-mentioned first and second embodiments, the output signal VQF from the first arithmetic circuit 3 and the output signal VQR from the second arithmetic circuit 4 are input to the OR circuit 6, and the output signal VQ' from the OR circuit 6 is used as the third output signal. In a third embodiment of the present invention, on the other hand, instead of using the first arithmetic circuit 3, the second arithmetic circuit 4, and the OR circuit 6, a first arithmetic circuit 3b, a second arithmetic circuit 4b, and an AND circuit 7 (corresponding to a third arithmetic circuit) are used to obtain the same effect.

Figure 8:
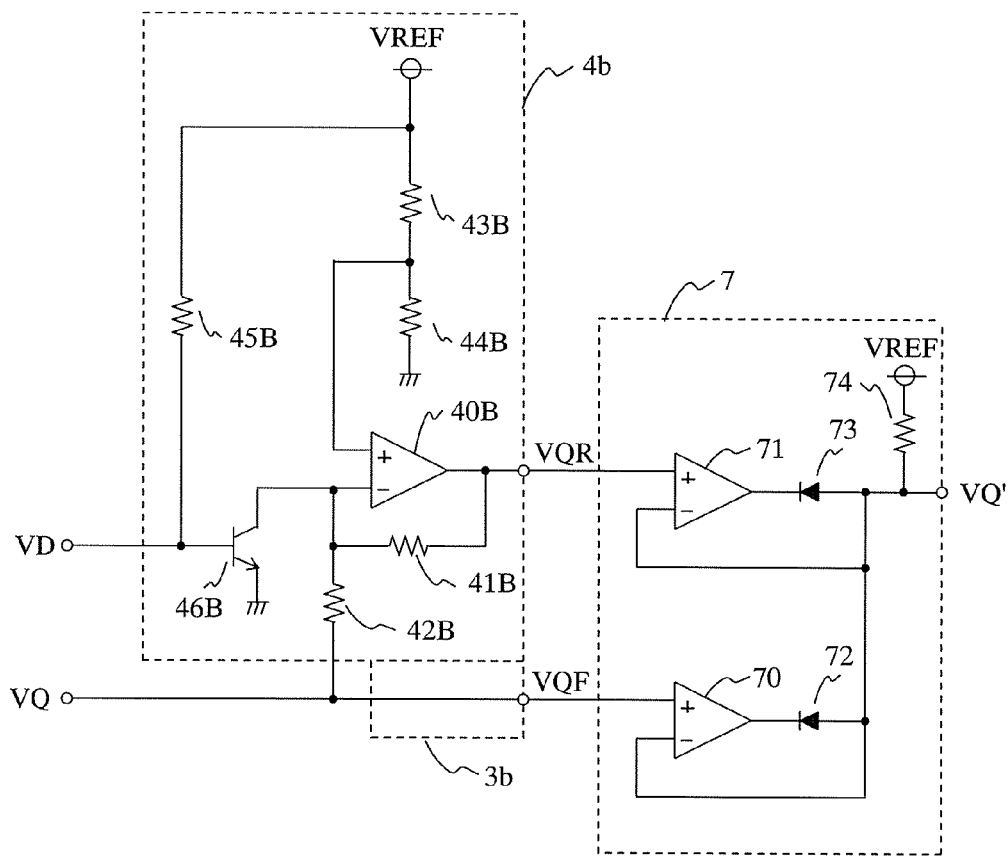
FIG. 8 is a diagram illustrating internal configurations of a first arithmetic circuit, a second arithmetic circuit, and an AND circuit included in a thermal flow sensor according to a third embodiment of the present invention.

FIG. 8 is a diagram illustrating internal configurations of the first arithmetic circuit 3b, the second arithmetic circuit 4b, and the AND circuit 7 included in a thermal flow sensor according to the third embodiment of the present invention. As illustrated in FIG. 8, an output signal VQF from the first arithmetic circuit 3b and an output signal VQR from the second arithmetic circuit 4b may be input to the AND circuit 7 as the third arithmetic circuit, and an output signal VQ' from the AND circuit 7 may be used as the third output signal.

The first arithmetic circuit 3b passes the input signal VQ without any operation and outputs the input signal VQ as the output signal VQF.

On the other hand, the second arithmetic circuit 4b is formed as a differential amplifier circuit by an operational amplifier 40B, resistors 41B to 45B, and a transistor 46B.

In a series element of the resistor 41B and the resistor 42B, a terminal on the resistor 42B side is connected to the input signal VQ, and a terminal on the resistor 41B side is connected to an output terminal of the operational amplifier 40B. A node between the resistor 41B and the resistor 42B is connected to an inverting input terminal of the operational amplifier 40B. On the other hand, a non-inverting input terminal of the operational amplifier 40B is grounded via the resistor 44B and is also connected to the reference voltage VREF via the resistor 43B.

A base terminal of the transistor 46B is connected to the reference voltage VREF via the resistor 45B and is also connected to the fluid direction detection signal VD. A collector terminal of the transistor 46B is connected to the node between the resistor 41B and the resistor 42B. An emitter terminal of the transistor 46B is grounded.

The transistor 46B operates as follows, depending on the fluid direction, namely the fluid direction detection signal VD as a base signal.

In normal flow (VD: OPEN) Transistor 46B: ON
In reverse flow (VD: L) Transistor 46B: OFF A voltage at the non-inverting input terminal of the operational amplifier 40B is set so as to be equal to an input signal VQ0 of the first arithmetic circuit 3b and the second arithmetic circuit 4b in a flat calm, similarly to the above-mentioned first embodiment. Further, the gain determined by the ratio between a resistance value R41 of the resistor 41B and a resistance value R42 of the resistor 42B is represented by A. In this case, the output of the operational amplifier 40B, namely the output signal VQR of the second arithmetic circuit 4b, is expressed by Expression (3) below:

In normal flowHigh (corresponding to a value higher than VQ)

In reverse flow $VQR=VQ0+A(VQ0-VQ)$ (3)

provided that A=R41/R42.

Figure 9:
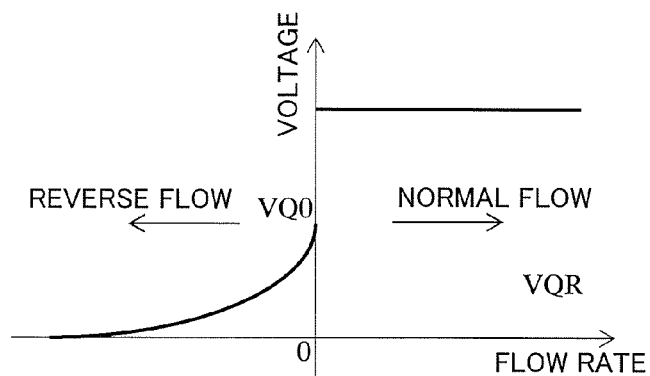
FIG. 9 is a graph showing the relationship between the flow rate and an output signal of the second arithmetic circuit according to the third embodiment of the present invention.

FIG. 9 is a graph showing the relationship between the flow rate and the output signal VQR of the second arithmetic circuit 4b according to the third embodiment of the present invention.

The AND circuit 7 as the third arithmetic circuit includes operational amplifiers 70 and 71, diodes 72 and 73, and a resistor 74. A non-inverting input terminal of the operational amplifier 70 inputs the output signal VQF of the first arithmetic circuit 3b. An output terminal of the operational amplifier 70 is connected to an inverting input terminal of the operational amplifier 70 via the diode 72 in the reverse direction, thereby forming an ideal diode.

Similarly, a non-inverting input terminal of the operational amplifier 71 inputs the output signal VQR of the second arithmetic circuit 4b. An output terminal of the operational amplifier 71 is connected to an inverting input terminal of the operational amplifier 71 via the diode 73 in the reverse direction, thereby forming an ideal diode.

An anode terminal of the diode 72 and an anode terminal of the diode 73 are connected to each other and are further connected to the reference voltage VREF via the resistor 74. As a result, a lower voltage of the output signal VQF of the first arithmetic circuit 3b and the output signal VQR of the second arithmetic circuit 4b is output as the third output signal VQ'. The relationship between the flow rate and the third output signal VQ' according to the third embodiment becomes as shown in FIG. 5. Thus, similarly to the above-mentioned first embodiment, the thermal flow sensor 9 in the third embodiment can obtain the third output signal VQ' as a flow rate detection signal that differs depending on the flow direction of the fluid.

As described above, according to the third embodiment of the present invention, the first arithmetic circuit, the second arithmetic circuit, and the AND circuit are used to generate the first output signal and the second output signal, and the first output signal is selected in the case of normal flow while the second output signal is selected in the case of reverse flow. As a result, similarly to the above-mentioned first embodiment, the circuit for obtaining a flow rate detection signal that differs depending on the flow direction of the fluid can be realized by a simple, inexpensive, and compact configuration as compared with the conventional technologies.

Figure 10A:
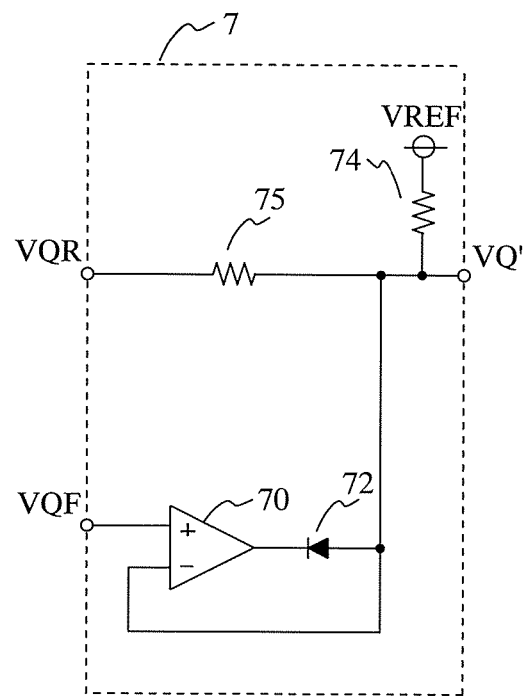
FIG. 10A is a diagram illustrating a different configuration of the AND circuit from FIG. 8 according to the third embodiment of the present invention.
Figure 10B:
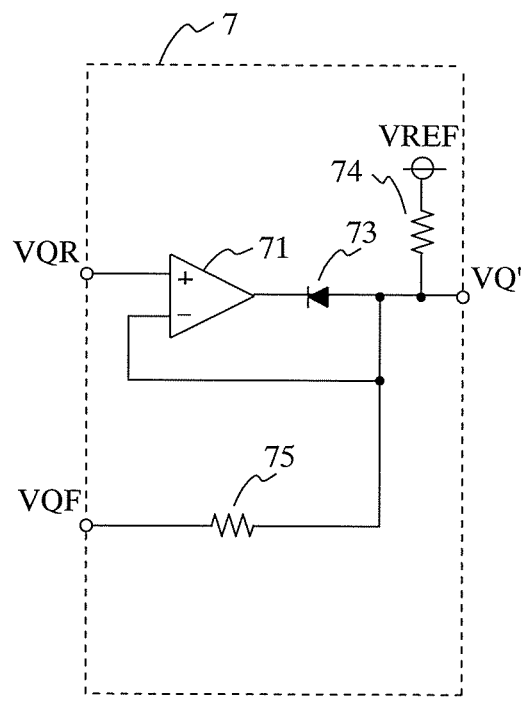
FIG. 10B is a diagram illustrating another different configuration of the AND circuit from FIG. 8 according to the third embodiment of the present invention.

Note that, in FIG. 8, the AND circuit 7 is formed of two ideal diodes. However, the AND circuit 7 in the third embodiment is not limited to this configuration. FIGS. 10A and 10B are diagrams illustrating different configurations of the AND circuit 7 from FIG. 8 according to the third embodiment of the present invention. As illustrated in FIGS. 10A and 10B, one of the ideal diodes may be formed of a resistor 75.

What is claimed is:

1. A thermal flow sensor, comprising:
a bridge circuit including a heating element, a fluid temperature detector, and a resistor, the heating element being supplied with a heating current so that temperature of the heating element becomes higher than temperature of a fluid detected by the fluid temperature detector by a predetermined temperature, the bridge circuit being configured to output a flow rate detection signal corresponding to the heating current;
a fluid direction detection circuit for outputting a flow direction of the fluid as a fluid direction detection signal; and
an arithmetic circuit being configured to:
generate a first output signal and a second output signal based on the flow rate detection signal output from the bridge circuit and the fluid direction detection signal output from the fluid direction detection circuit; and
select the first output signal when the fluid direction detection signal shows normal flow and select the second output signal when the fluid direction detection signal shows reverse flow, to thereby output a flow rate detection signal that takes the flow direction into account so that the flow rate detection signal takes different values between the normal flow and the reverse flow even at the same flow rate,
wherein the arithmetic circuit comprises:
a first arithmetic circuit for generating the first output signal so as to have a value lower than a value of VQ when the fluid direction detection signal shows the reverse flow and generating the first output signal so as to have a value equal to the value of VQ when the fluid direction detection signal shows the normal flow, where VQ represents the flow rate detection signal output from the bridge circuit;
a second arithmetic circuit for generating the second output signal in accordance with the following expression:

$VQ0+A\times(VQ0-VQ)$, where VQ represents the flow rate detection signal output from the bridge circuit, VQ0 represents a value of the flow rate detection signal in a flat calm, and A represents an arbitrary gain; and a third arithmetic circuit for performing OR operation of the first output signal generated by the first arithmetic circuit and the second output signal generated by the second arithmetic circuit, to thereby output the flow rate detection signal that takes the flow direction into account.

2. A thermal flow sensor according to claim 1, wherein the third arithmetic circuit comprises a plurality of ideal diodes.

3. A thermal flow sensor according to claim 1, wherein the third arithmetic circuit comprises an ideal diode and a resistor.

4. A thermal flow sensor, comprising:
a bridge circuit including a heating element, a fluid temperature detector, and a resistor, the heating element being supplied with a heating current so that temperature of the heating element becomes higher than temperature of a fluid detected by the fluid temperature detector by predetermined temperature, the bridge circuit being configured to output a flow rate detection signal corresponding to the heating current;
a fluid direction detection circuit for outputting a flow direction of the fluid as a fluid direction detection signal; and
an arithmetic circuit being configured to:
generate a first output signal and a second output signal based on the flow rate detection signal output from the bridge circuit and the fluid direction detection signal output from the fluid direction detection circuit; and
select the first output signal when the fluid direction detection signal shows normal flow and select the second output signal when the fluid direction detection signal shows reverse flow, to thereby output a flow rate detection signal that takes the flow direction into account so that the flow rate detection signal takes different values between the normal flow and the reverse flow even at the same flow rate,
wherein the arithmetic circuit comprises:
a first arithmetic circuit for generating the first output signal so as to have a value equal to a value of VQ, where VQ represents the flow rate detection signal output from the bridge circuit;
a second arithmetic circuit for generating the second output signal so as to have a value higher than the value of VQ when the fluid direction detection signal shows the normal flow and generating the second output signal in accordance with the following expression when the fluid direction detection signal shows the reverse flow:

$$VQ0 + A \times (VQ0 - VQ),$$

where VQ represents the flow rate detection signal output from the bridge circuit, VQ0 represents a value of the flow rate detection signal in a flat calm, and A represents an arbitrary gain; and a third arithmetic circuit for performing AND operation of the first output signal generated by the first arithmetic circuit and the second output signal generated by the second arithmetic circuit, to thereby output the flow rate detection signal that takes the flow direction into account.

5. A thermal flow sensor according to claim 4, wherein the third arithmetic circuit comprises a plurality of ideal diodes.

6. A thermal flow sensor according to claim 4, wherein the third arithmetic circuit comprises an ideal diode and a resistor.

7. A method of generating a flow rate detection signal by a thermal flow sensor,
the thermal flow sensor comprising:
a bridge circuit including a heating element, a fluid temperature detector, and a resistor, the heating element being supplied with a heating current so that temperature of the heating element becomes higher than temperature of a fluid detected by the fluid temperature detector by a predetermined temperature, the bridge circuit being configured to output a flow rate detection signal corresponding to the heating current;
a fluid direction detection circuit for outputting a flow direction of the fluid as a fluid direction detection signal; and
an arithmetic circuit comprising:
a first arithmetic circuit for generating the first output signal so as to have a value lower than a value of VQ when the fluid direction detection signal shows the reverse flow and generating the first output signal so as to have a value equal to the value of VQ when the fluid direction detection signal shows the normal flow, where VQ represents the flow rate detection signal output from the bridge circuit;
a second arithmetic circuit for generating the second output signal in accordance with the following expression:

$$VQ0 + A \times (VQ0 - VQ),$$

where VQ represents the flow rate detection signal output from the bridge circuit, VQ0 represents a value of the fluid rate detection signal in a flat calm, and A represents an arbitrary gain: and a third arithmetic circuit for performing OR operation of the first output signal generated by the first arithmetic and the second output signal generated by the second arithmetic circuit, to thereby output the flow rate detection signal that takes the flow direction into account, the method comprising:
generating a first output signal and a second output signal based on the flow rate detection signal output from the bridge circuit and the fluid direction detection signal output from the fluid direction detection circuit;
selecting the first output signal when the fluid direction detection signal shows normal flow and outputting the first output signal as a flow rate detection signal that takes the flow direction into account;
selecting the second output signal when the fluid direction detection signal shows reverse flow and outputting the second output signal as a flow rate detection signal that takes the flow direction into account; and
thereby outputting a flow rate detection signal that takes the flow direction into account so that the flow rate detection signal takes different values between the normal flow and the reverse flow even at the same flow rate.

8. A method of generating a flow rate detection signal by a thermal flow sensor,
the thermal flow sensor comprising:
a bridge circuit including a heating element, a fluid temperature detector, and a resistor, the heating element being supplied with a heating current so that temperature of the heating element becomes higher than temperature of a fluid detected by the fluid temperature detector by a predetermined temperature, the bridge circuit being configured to output a flow rate detection signal corresponding to the heating current;

a fluid direction detection circuit for outputting a flow direction of the fluid as a fluid direction detection signal; and an arithmetic circuit comprising:

a first arithmetic circuit for generating the first output signal so as to have a value equal to a value of VQ where VQ represents the flow rate detection signal output from the bridge circuit;

a second arithmetic circuit for generating the second output signal so as to have a value higher than the value of VQ when the fluid direction detection signal shows the normal flow and generating the second output signal in accordance with the following expression when the fluid direction detection signal shows the reverse flow:

$$VQ0 + A \times (VQ0 - VQ),$$

where VQ represents the flow rate detection signal output from the bridge circuit, VQ0 represents a value of the flow rate detection signal in a flat calm, and A represents an arbitrary gain; and a third arithmetic circuit for performing AND operation of the first output signal generated by the first arithmetic circuit and the second output signal generated by the second arithmetic circuit, to thereby output the flow rate detection signal that takes the flow direction into account, the method comprising:

generating a first output signal and a second output signal based on the flow rate detection signal output from the bridge circuit and the fluid direction detection signal output from the fluid direction detection circuit;

selecting the first output signal when the fluid direction detection signal shows normal flow and outputting the first output signal as a flow rate detection signal that takes the flow direction into account;

selecting the second output signal when the fluid direction detection signal shows reverse flow and outputting the second output signal as a flow rate detection signal that takes the flow direction into account; and thereby outputting a flow rate detection signal that takes the flow direction into account so that the flow rate detection signal takes different values between the normal flow and the reverse flow even at the same flow rate.

* * * * *